(12) United States Patent
Russhard et al.

(10) Patent No.: US 9,341,511 B2
(45) Date of Patent: May 17, 2016

(54) TIMING ANALYSIS

(75) Inventors: Peter Russhard, Nottingham (GB); Jason D. Back, Derby (GB)

(73) Assignee: ROLLS-ROYCE plc, London (GB)

( * ) Notice: Subject to any disclaimer, the term of this patent is extended or adjusted under 35 U.S.C. 154(b) by 719 days.

(21) Appl. No.: 12/453,728

(22) Filed: May 20, 2009

(65) Prior Publication Data
US 2009/0319206 A1   Dec. 24, 2009

(30) Foreign Application Priority Data
Jun. 18, 2008 (GB) .................................. 0811073.6

(51) Int. Cl.
*G01H 1/06* (2006.01)
*G01H 1/00* (2006.01)

(52) U.S. Cl.
CPC ...................................... *G01H 1/006* (2013.01)

(58) Field of Classification Search
CPC ....................................................... G01H 1/006
USPC .............. 702/33, 41, 56, 86, 87, 94, 96, 145; 73/570, 579, 587, 649, 659, 112.01, 73/494
See application file for complete search history.

(56) References Cited

U.S. PATENT DOCUMENTS

| | | | |
|---|---|---|---|
| 4,335,600 A | 6/1982 | Wu et al. | |
| 4,573,358 A | 3/1986 | Luongo | |
| 4,790,189 A | 12/1988 | Twerdochlib | |
| 4,887,468 A | 12/1989 | McKendree et al. | |
| 5,148,711 A | 9/1992 | Twerdochlib et al. | |
| 5,152,172 A * | 10/1992 | Leon et al. | 73/579 |
| 5,206,816 A | 4/1993 | Hill et al. | |
| 5,471,880 A * | 12/1995 | Lang et al. | 73/660 |
| 5,736,643 A | 4/1998 | Bores et al. | |
| 6,584,849 B2 * | 7/2003 | Loftus et al. | 73/659 |
| 7,861,592 B2 * | 1/2011 | Twerdochlib | 73/660 |

(Continued)

FOREIGN PATENT DOCUMENTS

FR   2866953 A1   9/2005
FR   2900745 A1   11/2007

(Continued)

OTHER PUBLICATIONS

Zielinski, M., et al., "Noncontact Vibration Measurements on Compressor Rotor Blades," Meas. Sci. Technol., 11 (2000) pp. 847-856.

(Continued)

*Primary Examiner* — Sujoy Kundu
*Assistant Examiner* — Ricky Ngon
(74) *Attorney, Agent, or Firm* — Oliff PLC

(57) ABSTRACT

A method is provided for identifying resonant frequency vibration events in an assembly of rotating blades mounted on a rotor. A plurality of circumferentially spaced stationary timing probes associated with the blades detect the times at which the blades pass the respective probes. The method includes the steps of: obtaining blade timings detected by the probes, determining, for successive rotations of the assembly, respective correlation factors for one or more of the blades, each correlation factor quantifying the degree of correlation between the blade timings detected by the probes for a particular blade on a particular rotation and the blade timings detected by the probes for that blade on the previous rotation and identifying a resonant vibration event when the one or more correlation factors cross a predetermined threshold.

16 Claims, 10 Drawing Sheets

(56) References Cited

U.S. PATENT DOCUMENTS

2002/0162395 A1   11/2002  Chatellier et al.
2005/0038570 A1    2/2005  Grauer
2010/0116044 A1*  5/2010  Mitaritonna et al. ........... 73/147

FOREIGN PATENT DOCUMENTS

| | | |
|---|---|---|
| JP | A 2002-98584 | 4/2002 |
| RU | 2 326 362 C1 | 6/2008 |
| WO | 2004/021298 A2 | 3/2004 |
| WO | 2007/071912 A2 | 6/2007 |

OTHER PUBLICATIONS

Jan. 29, 2010 Office Action issued in European Patent Application No. 09251322.5.

Sep. 7, 2010 Office Action issued in European Patent Application No. 10171193.5.

Nov. 18, 2009 Office Action issued in European Patent Application No. 09251322.5.

Sep. 7, 2010 Office Action issued in European Patent Application No. 10171194.3.

\* cited by examiner

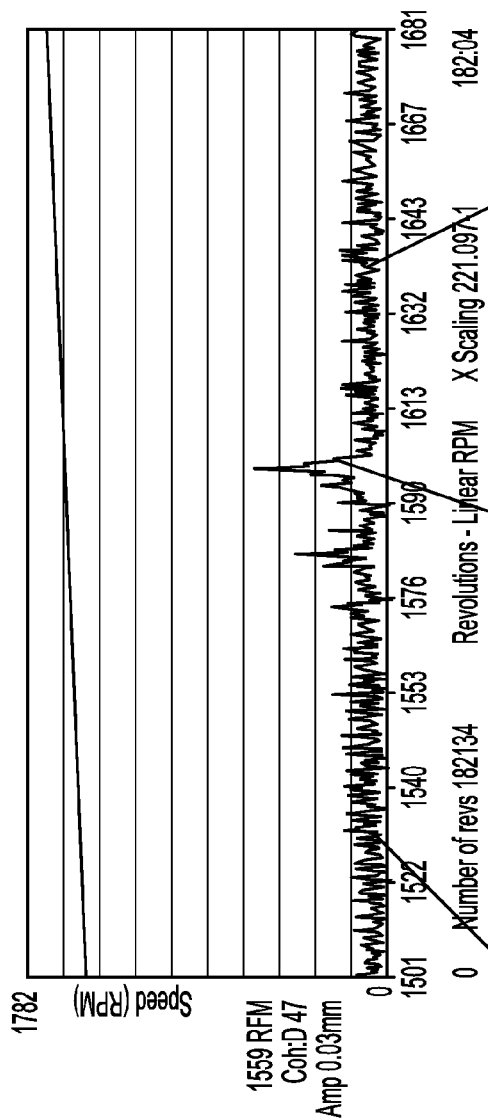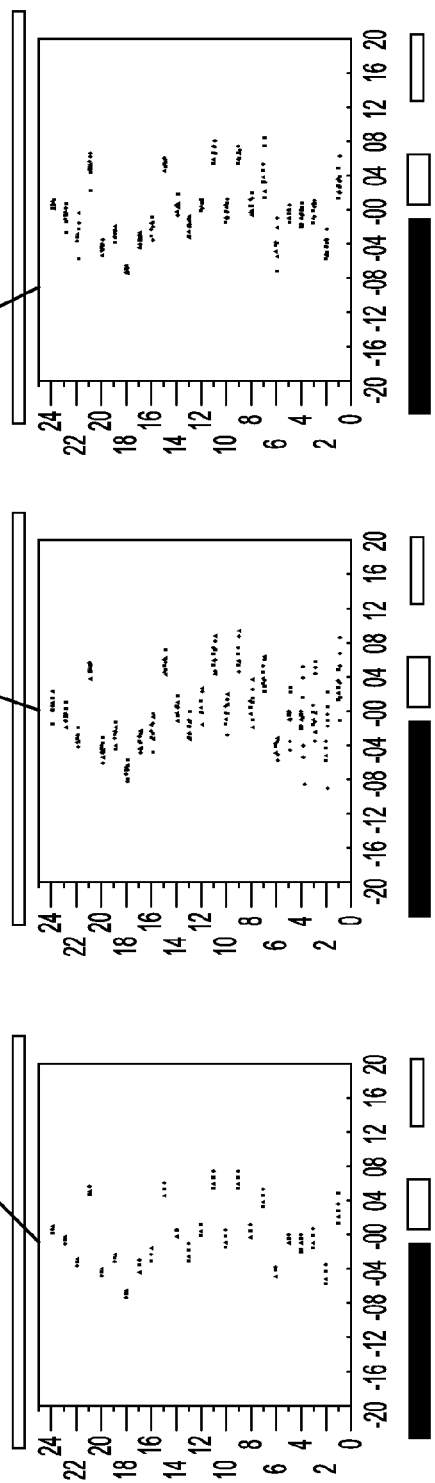

linear control law exponential control law

TIMING ANALYSIS

The present invention relates to the timing analysis of rotating blades, such as those found in gas turbine engines.

In the development of gas turbine engines, it is important to determine the amount of vibration of the rotating blades. From vibration measurements, stresses induced in the blades may be determined. Action can then be taken to avoid stresses which are high enough to cause damage to the blades.

As described for example in US patent application no. 2002/0162395, it is known to mount strain gauges on rotating compressor/turbine blades to provide information about the amplitudes and frequencies of vibration of the blades. One or more strain gauges can be provided on each blade, and connected to a radio telemetry system mounted on the rotor, which transmits the measurements from the rotor. However, due to the number of strain gauges required to fully determine the vibrations, the telemetry system is typically complex, expensive, large and time-consuming to install within the rotor.

An alternative technique for characterising blade rotation is "blade tip timing" (BTT) in which non-contact timing probes, typically mounted on the engine casing, are used to measure the time at which a blade passes each probe. This time is compared with the time at which the blade would have passed the probe if it had been undergoing no vibration. This is termed the "expected arrival time" and can be calculated from the rotational position of the particular blade on the rotor in conjunction with a "once per revolution" or "OPR" signal which provides information about the position of the rotor. The OPR signal is derived from the time at which an indicator on the rotor passes a reference sensor, and its use is well known in the art.

The difference between the expected arrival time and the actual arrival time can be multiplied by the blade tip velocity to give the displacement of the blade from its expected position. Thus BTT data from a particular probe effectively measures blade tip displacement at the probe.

Advantageously, the tip timing method does not require a telemetry system since the probes are mounted on the casing.

However, because the sampling rate of the probes is determined by the rotational frequency of the rotor, it is often below the Nyquist frequency for the vibrations of interest. Thus each probe undersamples the vibrations, leading to problems such as aliasing. A further problem with BTT data is that it is often intrinsically noisy due to probe movement caused by mounting restrictions and casing thickness.

Nonetheless, with a plurality of timing probes, it is possible, in principle, to perform useful vibration analysis that can be converted into blade stresses. However, conventionally, such analysis requires manual intervention, and is highly dependent on the skill of the operator performing the analysis. Indeed, different operators, confronted with the same data, may analyse it in different ways, to produce different results.

Largely because of the need for skilled manual intervention, the use of tip timing information is conventionally limited to the development phase of gas turbine engines.

The present invention seeks to address problems of operator subjectivity and analysis repeatability by providing techniques which can be used to automate and objectify the analysis of BTT data. An advantage of an automated analysis system is that it can be used for real-time health monitoring applications, i.e. not just the development phase of engines.

A first aspect of the present invention provides a method of identifying resonant frequency vibration events in an assembly of rotating blades mounted on a rotor, a plurality of circumferentially spaced stationary timing probes associated with the blades detecting the times at which the blades pass the respective probes, the method including the steps of:

obtaining blade timings detected by the probes;

determining, for successive rotations of the assembly, respective correlation factors for one or more of the blades, each correlation factor quantifying the degree of correlation between the blade timings detected by the probes for a particular blade on a particular rotation and the blade timings detected by the probes for that blade on the previous rotation; and identifying a resonant vibration event when the one or more correlation factors cross a predetermined threshold. The obtaining step may include detecting the times at which the blades pass the respective probes.

Advantageously, the use of the correlation factor can avoid operator subjectivity, providing increased reproducibility and consistency in the identification of resonant vibration events. Particularly in relation to synchronous vibration events, identification based on the correlation factor can lead to event identifications which may be overlooked by manual analysis.

Correlation factors may be determined for a plurality of the blades, and e.g. combined into an average correlation factor. A resonant vibration event may then be identified when the average correlation factor crosses the predetermined threshold.

The method may further include the step of processing the blade timings by performing the substeps of:

selecting one of the timing probes;

fitting an averaging curve to the blade timings of the selected probe outside the identified resonant vibration events;

interpolating sections for the averaging curve at the blade timings of the selected probe inside the identified resonant vibration events;

augmenting the averaging curve with the interpolated sections; and subtracting the augmented averaging curve from the blade timings of the selected probe to produce zeroed blade timings for the selected probe.

This procedure allows DC trends in blade timing data (caused for example by aerodynamic loading of the blades) to be removed before subsequent analysis steps are performed.

The method may further include the step of filtering the blade timings by performing the substeps of:

selecting one of the timing probes;

transforming the blade timings of the selected probe into the frequency domain, the transformed timings producing tracked orders at the identified resonant vibration events in a plot of frequency against time;

defining integral sampling positions as frequencies corresponding to the rotational frequency of the rotor and multiples thereof up to the multiple corresponding to the number of blades in the assembly;

for the identified resonant vibration events, determining the tracked order positions relative to the integral sampling positions; and filtering the blade timings of the selected probe at the identified resonant vibration events in the time domain, the characteristic of the filter varying depending on the corresponding relative tracked order positions in the frequency domain.

Advantageously, appropriate filter characteristics can then be applied consistently and reproducibly to different types of resonant vibration events. For example, an asynchronous vibration event midway between integral sampling positions generally requires different filter characteristics to a synchronous vibration event at an integral sampling position. Thus, the filter can adapt to the spectral content of the timing data, which is determined by the signal frequency being analysed.

A second aspect of the invention corresponds to the optional processing step of the first aspect, and provides a method of processing blade timings detected by a stationary timing probe associated with an assembly of rotating blades mounted on a rotor, the probe detecting the times at which the blades pass the probe, the method including the steps of:

obtaining blade timings detected by the probe;

identifying one or more resonant vibration events in the timing data;

fitting an averaging curve to the blade timings outside the identified resonant vibration events;

interpolating sections for the averaging curve at the blade timings inside the identified resonant vibration events;

augmenting the averaging curve with the interpolated sections; and subtracting the augmented averaging curve from the blade timings to produce zeroed blade timings. The obtaining step may include detecting the times at which the blades pass the probe.

The method of this aspect may further include the step of filtering the blade timings by performing the substeps of:

transforming the blade timings into the frequency domain, the transformed timings producing tracked orders at the identified resonant vibration events in a plot of frequency against time;

defining integral sampling positions as frequencies corresponding to the rotational frequency of the rotor and multiples thereof up to the multiple corresponding to the number of blades in the assembly;

for the identified resonant vibration events, determining the tracked order positions relative to the integral sampling positions; and filtering the blade timings at the identified resonant vibration events in the time domain, the characteristic of the filter varying depending on the corresponding relative tracked order positions in the frequency domain.

A third aspect of the invention corresponds to the optional filtering steps of the first and second aspects, and provides a method of filtering blade timings detected by a stationary timing probe associated with an assembly of rotating blades mounted on a rotor, the probe detecting the times at which the blades pass the probe, the method including the steps of:

obtaining blade timings detected by the probe;

identifying one or more resonant vibration events in the timing data;

transforming the blade timings into the frequency domain, the transformed timings producing tracked orders at the identified resonant vibration events in a plot of frequency against time;

defining integral sampling positions as frequencies corresponding to the rotational frequency of the rotor and multiples thereof up to the multiple corresponding to the number of blades in the assembly;

for the identified resonant vibration events, determining the tracked order positions relative to the integral sampling position; and filtering the blade timings for the identified resonant vibration events in the time domain, the characteristic of the filter varying depending on the corresponding relative tracked order positions in the frequency domain. The obtaining step may include detecting the times at which the blades pass the probe.

The following optional features apply to each of the first, second and third aspects. The or each identified resonant vibration event can be a synchronous resonant vibration event. Preferably, the or each probe measures the deflections of the tips of the blades. The frequencies of the vibration events may be undersampled by the or each probe.

Having performed the method of the first, second or third aspect, blade vibration amplitudes and/or frequencies may be extracted from the blade timings using techniques known to the skilled person.

A fourth aspect of the invention provides a computer-based system for performing the method of any one of the first, second and third aspects. A fifth aspect of the invention provides a computer program for performing the method of any one of the first, second and third aspects. A sixth aspect of the invention provides a computer program product carrying a program according to the fifth aspect.

Embodiments of the invention will now be described by way of example with reference to the accompanying drawings in which:

FIG. 9a shows displacement data from a set of timing probes for one blade, and FIGS. 9b to d respectively show corresponding stack patterns at three instances during the time period of the displacement data;

Figure 11:
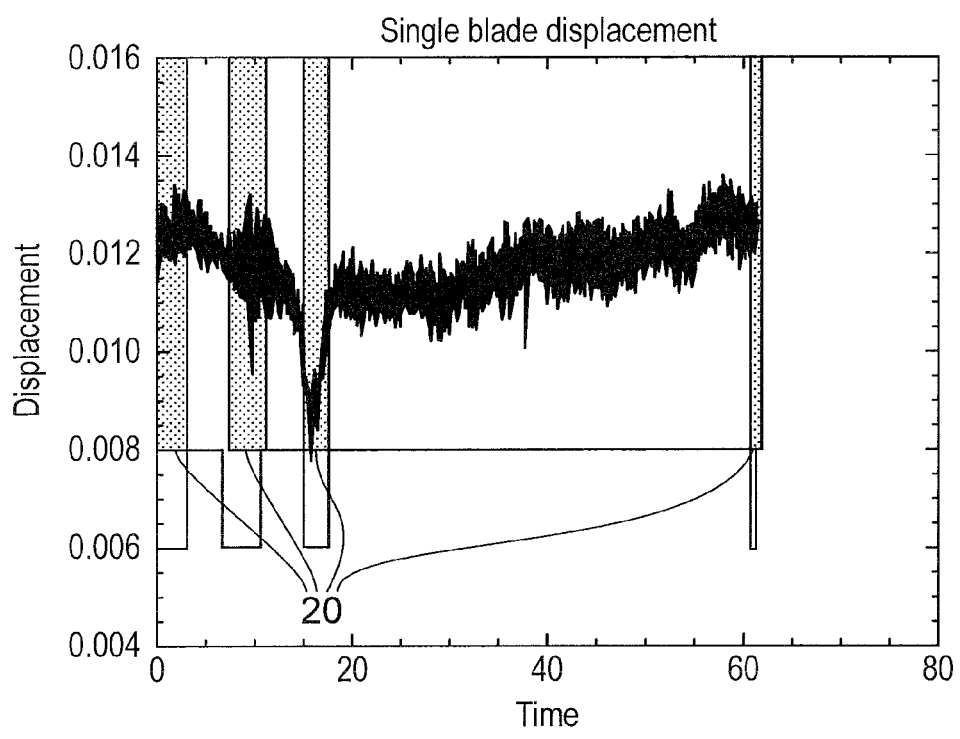
FIG. 11 shows displacement data for a probe/blade pair, and four regions identified as resonance vibration events.
Figure 12:
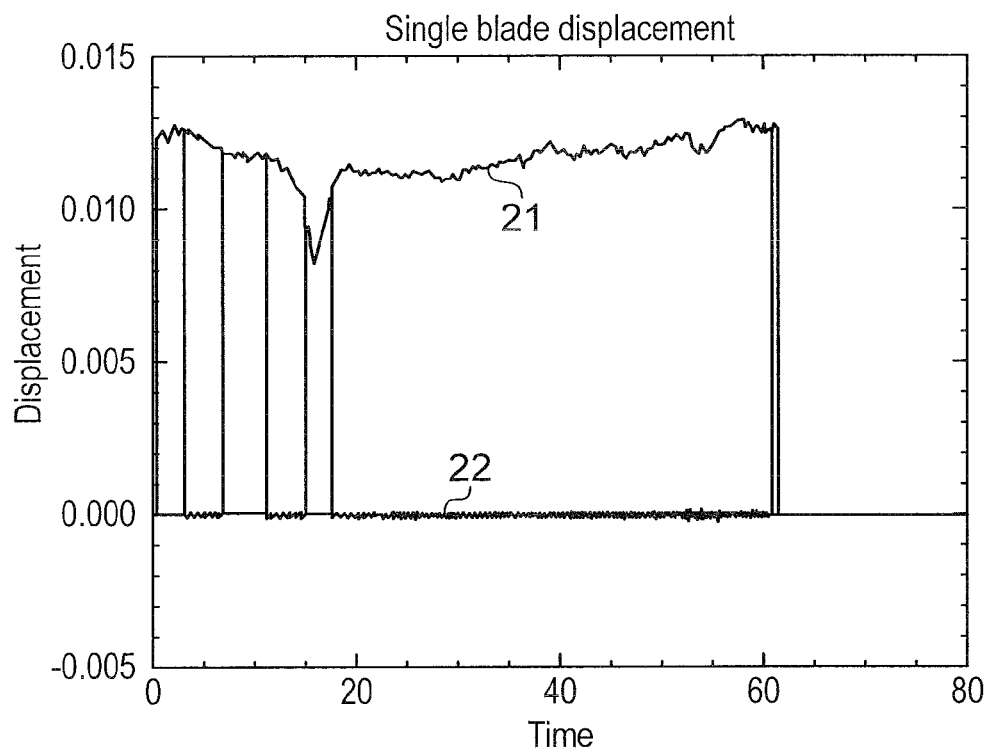
Figure 13:
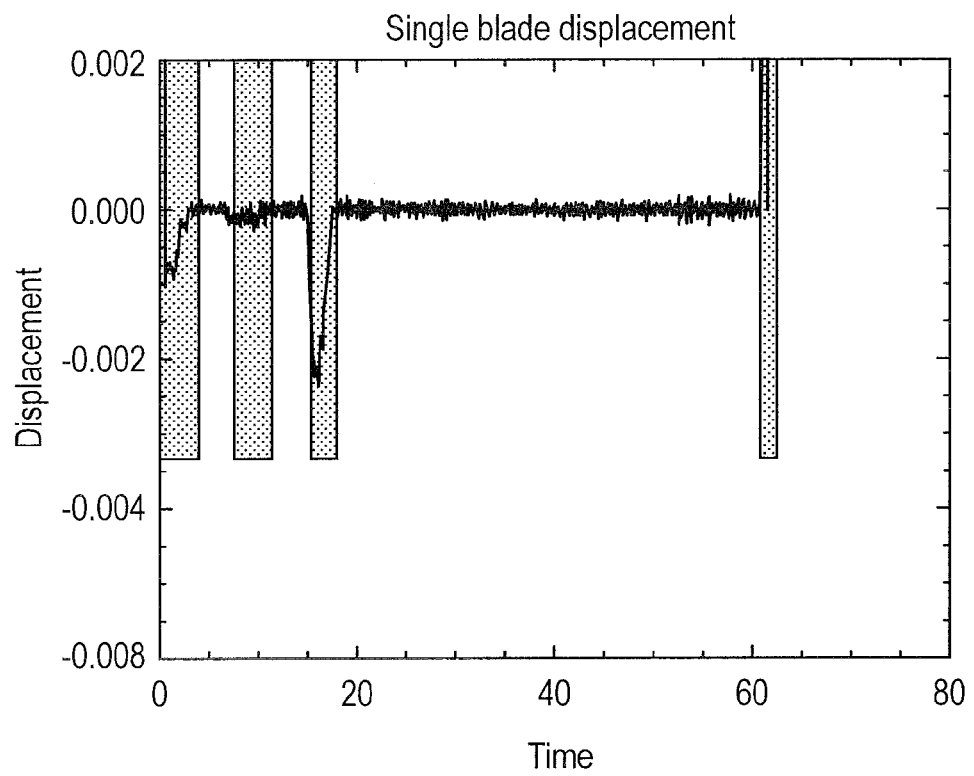
Figure 14:
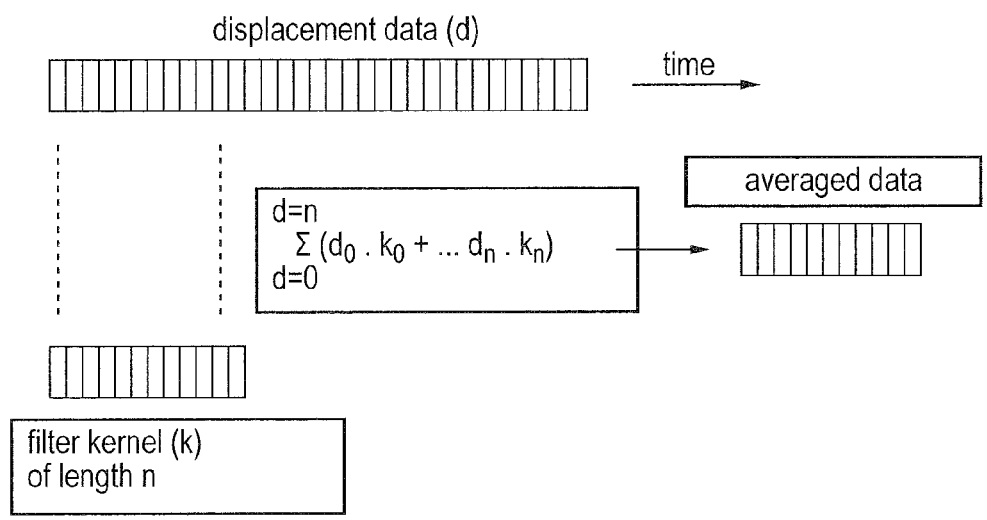
Figure 15:
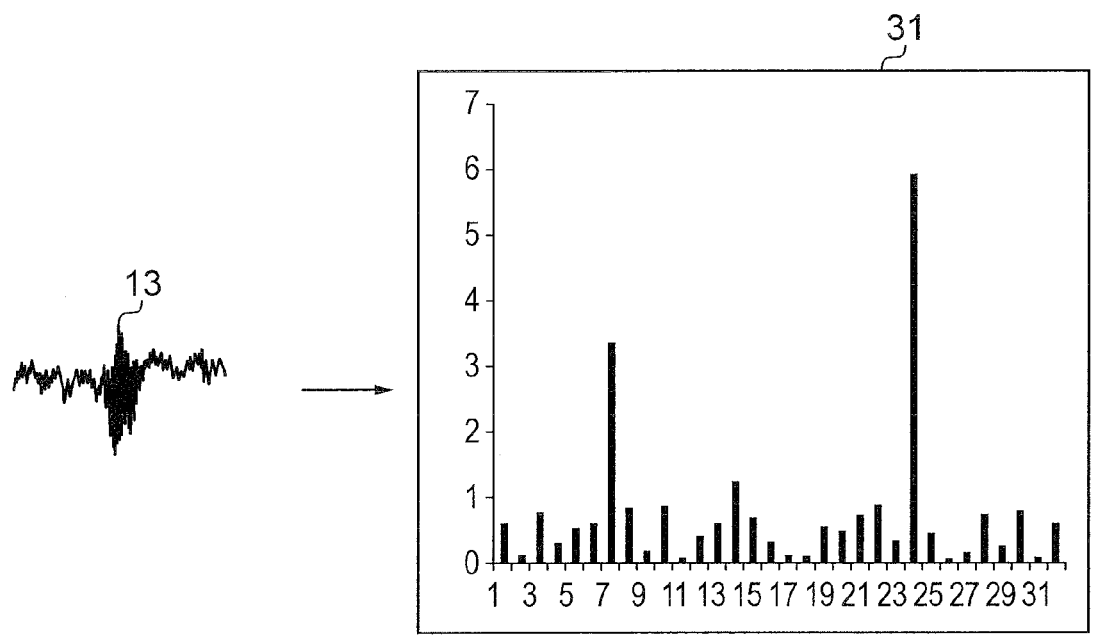
Figure 16:
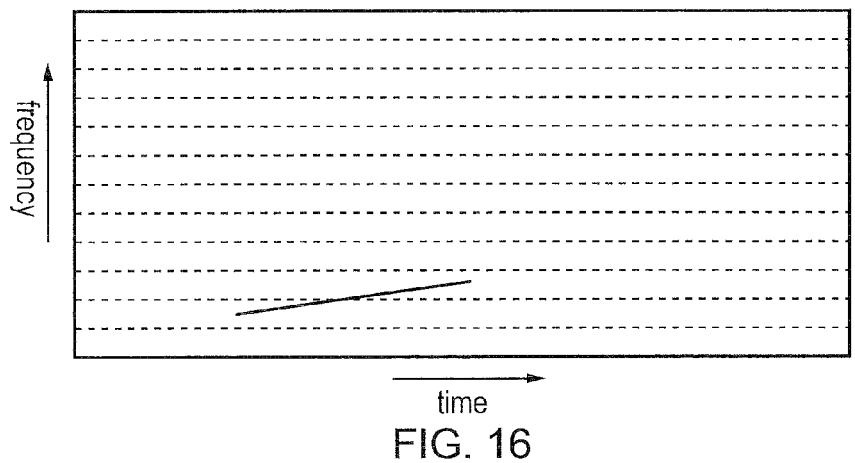
Figure 17A:
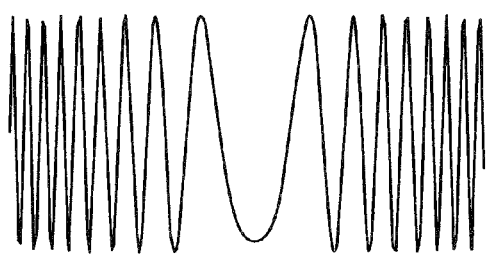
Figure 17B:
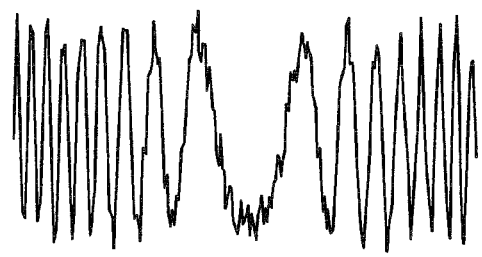
Figure 18A:
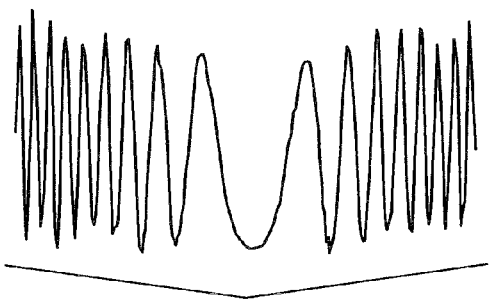
Figure 18B:
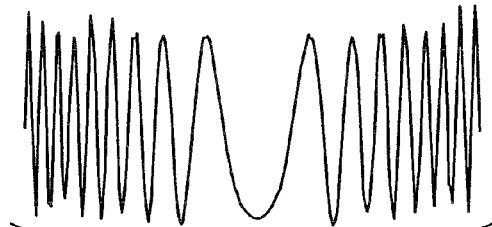
Figure 19A:
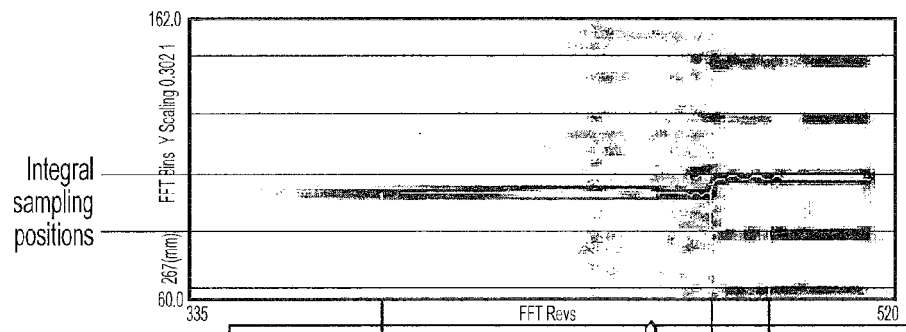
Figure 19B:
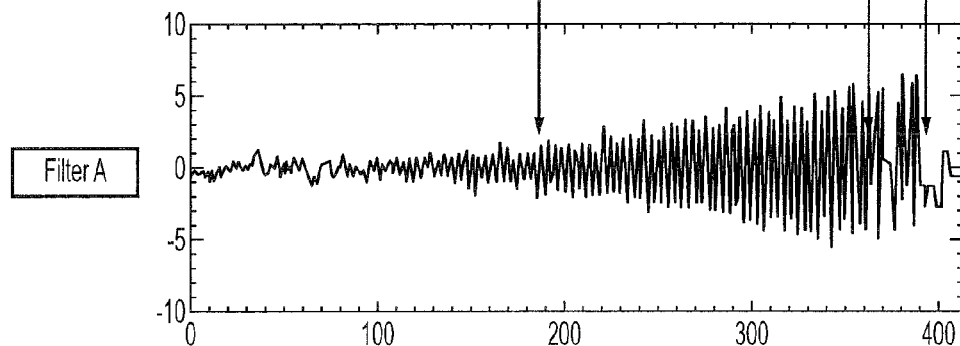
Figure 19C:
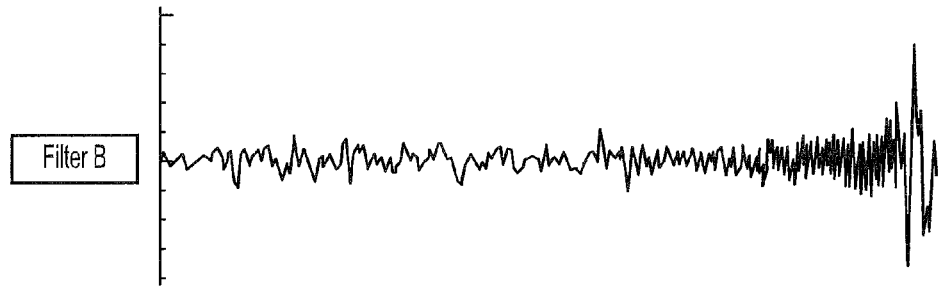
Figure 19D:
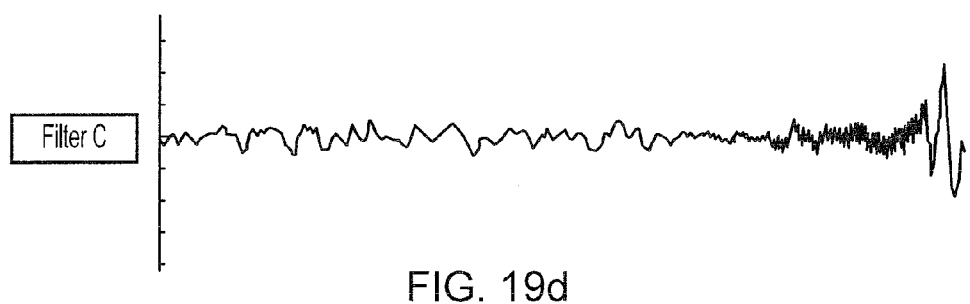

FIG. 12 shows a curve 21 produced by averaging the data of FIG. 11, and a further curve 22 which is the result of subtracting the averaging curve 21 from the data of FIG. 11 outside the four regions which have been identified as resonance vibration events;

FIG. 13 shows zeroed data of FIG. 11;

FIG. 14 is a schematic diagram of a convolution kernel for producing an averaging curve;

FIG. 15 shows schematically displacement data 30 at a vibration event, and the corresponding frequency domain data 31;

FIG. 16 is a schematic plot of frequency against time, and shows a tracked order as a thick continuous sloping line and integral sampling positions as horizontal dashed lines;

FIG. 17a shows schematically theoretical time domain displacement data for a vibration event registered at a single probe for a single blade, and FIG. 17b shows schematically a representation of actual time domain displacement data affected by noise;

FIG. 18a shows the effect of a control law applying a linear change in cut off frequency with bin position applied to the data of FIG. 17b, and FIG. 18b shows the effect of a control law applying an exponential change in cut off frequency with bin position applied to the data of FIG. 17b; and FIG. 19a shows a plot of frequency against time, a tracked order corresponding to a vibration event appearing as a thick line with consecutive sections A, B and C, and FIGS. 19b to d are corresponding plots of displacement against time showing respectively the effects of different filters A to C on the displacement data collected by a single probe from all the blades of the rotor for the time period of the tracked order.

Figure 1:
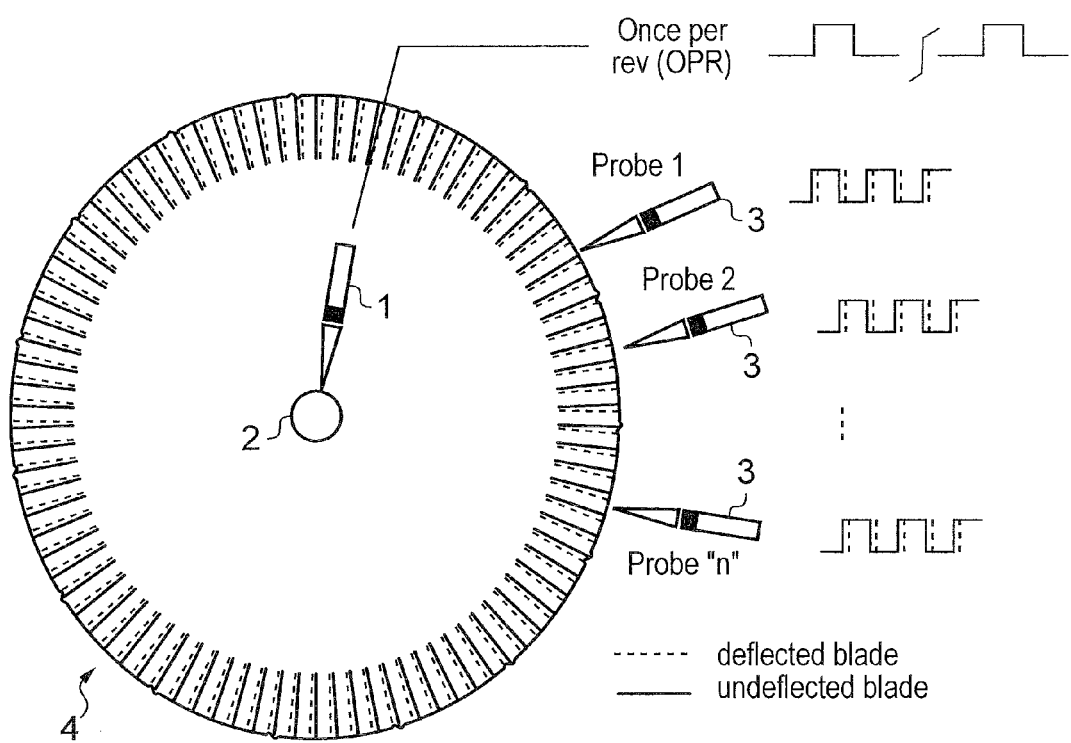
FIG. 1 shows schematically a BTT arrangement.

FIG. 1 shows schematically a BTT arrangement. An OPR probe 1 monitors the position of rotor 2, while 1 to n BTT probes 3 provide timings for blades 4 mounted to the rotor.

Figure 2:
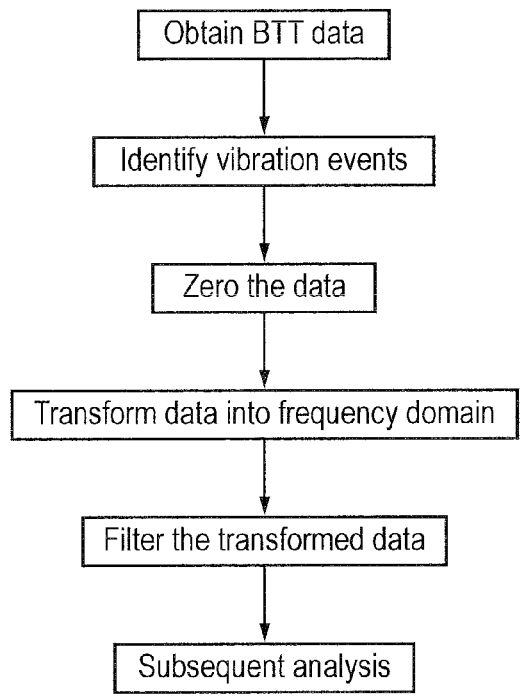
FIG. 2 is a flow chart showing procedural steps in the processing of the timing data obtained by the probes of FIG. 1.

FIG. 2 is a flow chart showing procedural steps in the processing of the timing data obtained by the probes. Firstly, the data is analysed to identify resonant vibration events. Having identified these events, the data is zeroed and transformed into the frequency domain. The transformed data is filtered to reduce the amount of noise in the signals. The data is then ready for further analysis, such as characterisation (e.g. quantifying phases and amplitudes) of the vibration events in a manner known to the skilled person. Below, we discuss in more detail the steps of identifying the resonant vibration events, zeroing the data, and filtering the data.

Figure 3:
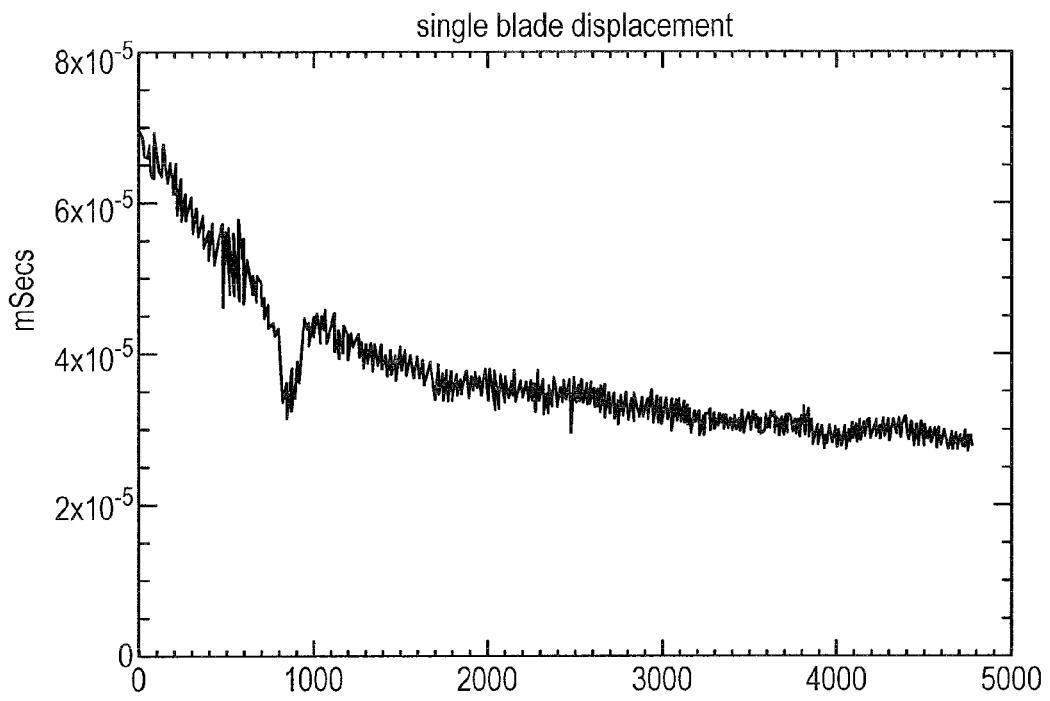
FIG. 3 shows typical displacement data from a timing probe for one blade.

FIG. 3 shows typical displacement data from a timing probe for one blade. The data have been pre-processed to reject spikes, but otherwise contain the same amount of noise as the initial data. The rotor speed increased during the course of the data acquisition, and the large DC downwards trend in the data is caused by the consequent aerodynamic loading of the blade.

The data are relatively noisy, but applying simple amplitude thresholding, at least one possible vibration event can be identified at about 800 revolutions.

However, amplitude thresholding can be a misleading approach to identifying vibration events. Firstly, amplitude thresholding can produce false positives due to the noise in the signal. Secondly, amplitude thresholding can overlook particularly vibration events caused by synchronous blade responses. In a synchronous response, the blade vibrates at a frequency which is an exact multiple of the sampling frequency for the blade at the BTT probes (i.e. an exact multiple of the OPR frequency). Typically, such a response produces only a DC shift in the timing data, and that shift can be relatively small. In contrast, asynchronous responses, for which there is no correlation between the frequency of the vibrational response of a blade and the BTT probe sampling frequency, are generally easier to identify by simple amplitude thresholding, although signal noise may still cause difficulties, and the DC shift in the blade position requires that the threshold level changes throughout a manoeuvre.

Figure 4:
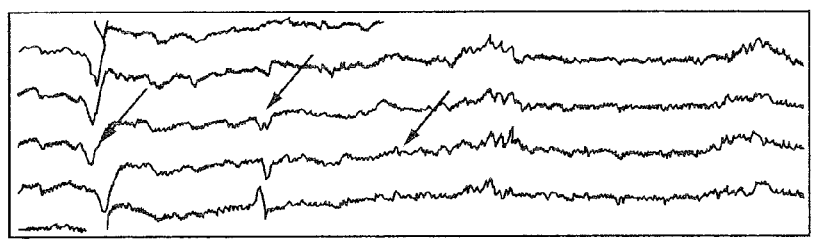
FIG. 4 shows further typical displacement data for different blades at the same probe.

FIG. 4 shows further typical displacement data for different blades at the same probe. Vibration events are marked with arrows. The duration of each event may be very small and each blade may respond differently and at a different time, making visual identification of events extremely subjective.

A more reliable method for identifying both synchronous and asynchronous vibration events is based on the realisation that the timing data from each probe produces a characteristic "stack pattern", and that that pattern is disturbed for both synchronous and asynchronous events.

Figure 5:
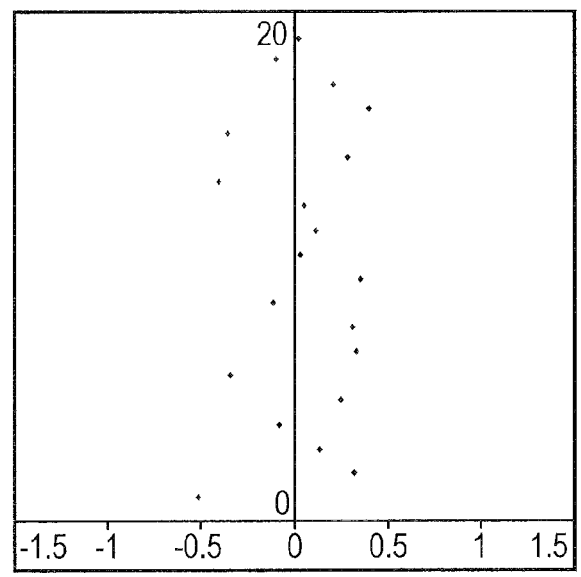
FIG. 5 shows a typical, off-resonance, stack pattern for a timing probe.

FIG. 5 shows a typical, off-resonance, stack pattern for a single probe in relation to a rotor with 20 blades, the blade number is provided on the y-axis and the displacement of each blade is the x-axis. Due to the mechanical differences in blade spacing caused by manufacturing tolerances, the displacements vary slightly for each blade, producing a unique characteristic pattern for the rotor. Each point of the stack pattern is produced by averaging off-resonance blade timings for the respective blade.

Figure 6:
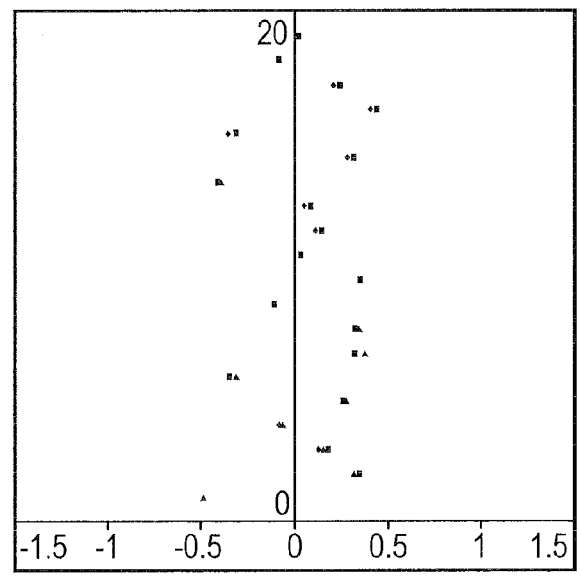
FIG. 6 shows the stack pattern of FIG. 5 overlaid with off-resonance stack patterns for a number of other timing probes.

To a high degree of correlation, the other probes produce the same off-resonance pattern, as illustrated in FIG. 6 which shows the stack pattern of FIG. 5 overlaid with the off-resonance patterns for a number of other probes. Each probe observes the same stack pattern when the data has been corrected for the circumferential position of the probe.

Figure 7:
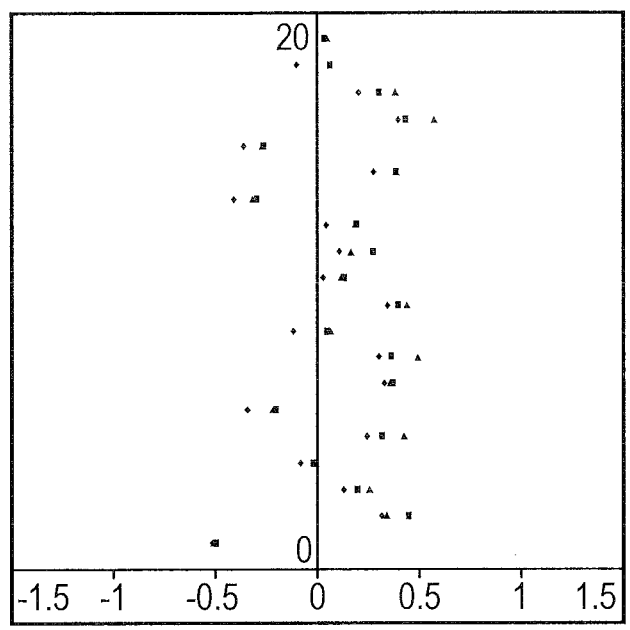
FIG. 7 shows a stack pattern for the timing probe of FIG. 5 during a vibration event.

However, as the rotor condition changes and a vibration event commences, the stack patterns begin to spread, as shown in FIG. 7, causing the degree of correlation to drop. Similar stack pattern spreads are observed for both synchronous and asynchronous events.

The displacement value at each probe for a single blade is correlated to the values for the next rotation to obtain a measure between 0 and 1 indicating Pearson product moment correlation coefficient for the two sets of data. This value is squared to provide a correlation factor, R. More specifically:

$$R = \left( \frac{1}{n-1} \sum \left( \frac{D_i - \overline{D}}{s_D} \right)\left( \frac{d_i - \overline{d}}{s_d} \right) \right)^2$$

where n is the number of probes, $D_i$ and $d_i$ are the displacements of the selected blade at the $i^{th}$ probe for respectively the present rotation and the previous rotation, $\overline{D}$ and $\overline{d}$ are the average displacements of the selected blade at the probes for respectively the present rotation and the previous rotation, and $s_D$ and $s_d$ are the standard deviations of the blade displacements for respectively the present rotation and the previous rotation.

A threshold of, for example, less than 0.95 for the correlation factor is used to determine the presence of vibration.

Typically, all the blades respond to a vibration event at the same time, so in general the correlation factor only needs to be calculated for a single blade. However, the correlation factors of all or some of the blades can be combined, e.g. as an average correlation factor.

Figure 8:
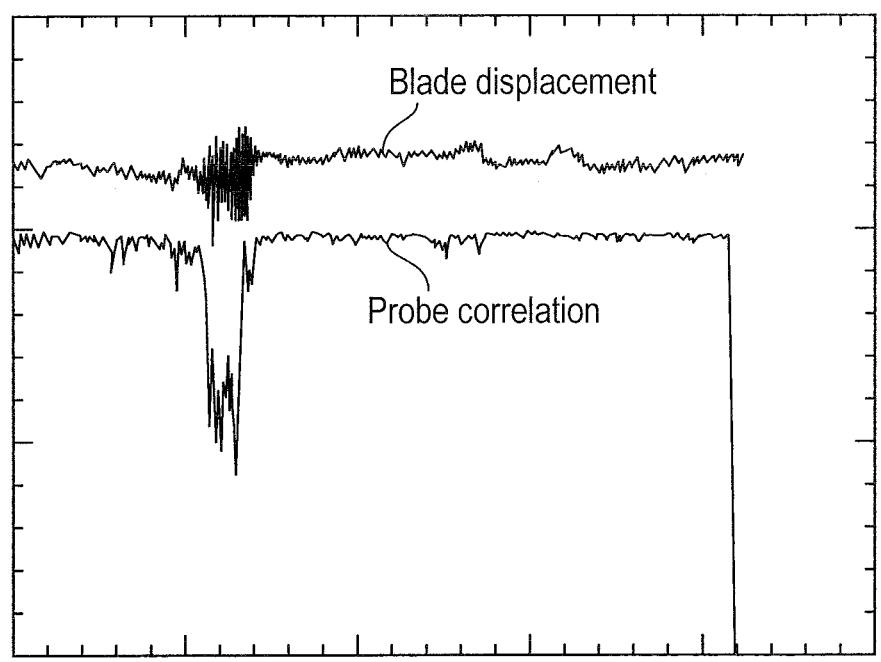
FIG. 8 shows a plot of blade displacement correlation relative to the off-resonance blade displacements against time for a single probe.

FIG. 8 shows a plot of blade displacement correlation relative to the off-resonance blade displacements against time for a single probe. For comparison, corresponding displacement data are also provided for a single blade at the probe. The main displacement event occurs simultaneously with a large drop in correlation, indicating a likely vibration event.

FIG. 9a shows displacement data from a timing probe for one blade, and FIGS. 9b to d corresponding stack patterns at three instances during the time period of the displacement data. The left hand stack pattern at FIG. 9b is at an instance when there is no vibration event. As expected the displacement values for each blade are well correlated. The middle and right hand stack patterns at FIGS. 9c and d respectively, however, are at instances when there are synchronous vibration events. These events are evidenced by the loss of correlation in the stack patterns. For the middle stack pattern of FIG. 9c, the corresponding part of the displacement data shows a peak which could possibly have been detected by simple thresholding the displacement data. On the other hand, the corresponding part of the displacement data for the right hand stack pattern of FIG. 9d does not have a significant peak, and so could have been missed using simple thresholding or visual identification approaches.

Figure 10:
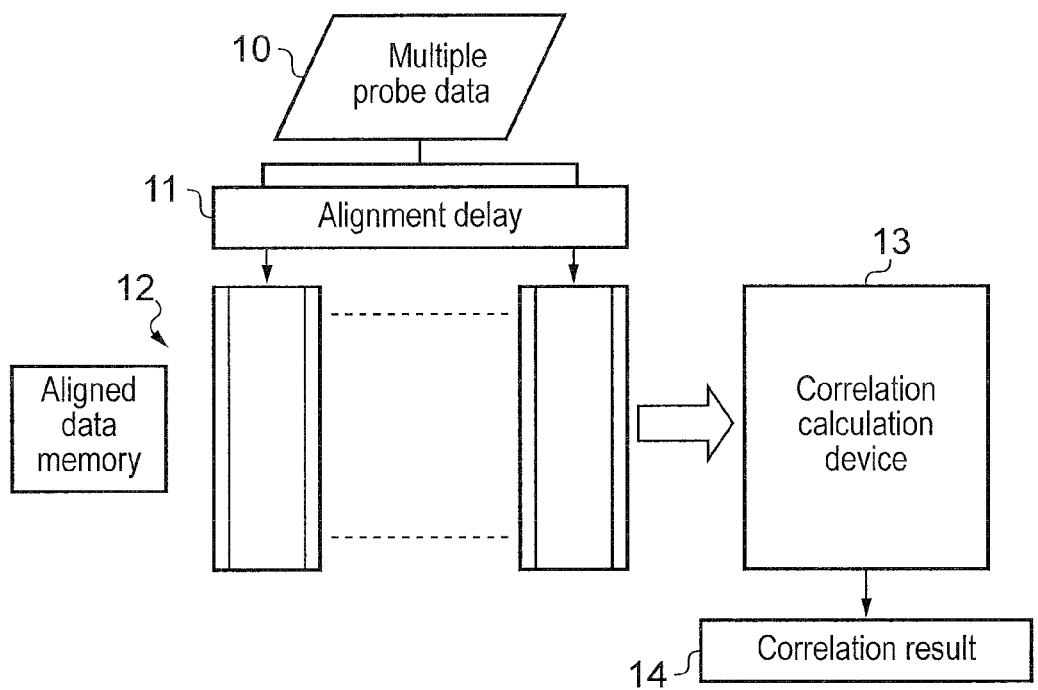
FIG. 10 shows schematically a detector for event identification.

FIG. 10 shows schematically a detector for event identification. The discrete data 10 from the multiple probes are sent to an alignment delay device 11 in which data from each probe are aligned in a respective array having a number of memory locations. Data arrives misaligned in time due to the probe spacing around the rotor. However, in the alignment delay device 11, the data are shifted into alignment by counting the number of blades between each probe and applying a corresponding fixed offset consisting of additional memory locations for each array. Data may also be averaged over more than one revolution.

Data are moved through the alignment arrays at a rate equal to the blade probe passing frequency (OPR frequency×number of blades). The number of complete revolutions held in the arrays can be changed to increase or decrease the response time of the event detector.

The aligned data are then moved into further memory arrays 12, each further array corresponding to a respective probe, and having one cell for each blade.

Finally, the data in the further memory arrays 12 are acted upon by a DSP (digital signal processor) correlation device 13 to provide a correlation result 14. Depending on the value of this result, a vibration event may be signalled.

Next, as a precursor to applying a fast Fourier transform (FFT), the displacement data for each probe/blade pair are "zeroed" by removing DC trends (such as the large DC trend shown in FIG. 3 caused by aerodynamic loading). The preferred zeroing procedure involves fitting an averaging curve to the displacement data, and subtracting that curve from the original displacement data.

FIG. 11 shows displacement data for a probe/blade pair. Four regions 20 are indicated which have been previously identified as resonance vibration events. If an averaging curve is fitted to the entire sequence of data, and then subtracted from the entire sequence, there is a risk that signals of interest, and particularly synchronous response events, will be attenuated.

Thus, the averaging curve is only subtracted from the data outside identified events, or at least only subtracted from the data outside identified synchronous resonance events.

FIG. 12 shows a curve 21 produced by averaging the data of FIG. 11, and a further curve 22 which is the result of subtracting the averaging curve 21 from the data of FIG. 11 outside the four regions 20 which have been identified as resonance vibration events.

By applying linear interpolation across the averaging curve 21 at the four regions 20, the curve 21 is augmented to cover the entire sequence of displacement data of FIG. 10.

The augmented curve 21 can then be subtracted from the data of FIG. 11 to produce the zeroed data shown in FIG. 13.

The averaging curve can be generated by passing the displacement data through a convolution kernel which has been optimised for BTT data. The length of the kernel determines the number of samples before the first output appears from its output, and hence its latency. FIG. 14 is a schematic diagram of the kernel. Savitsky-Golay filters can provide suitable kernels. The filter length (n in FIG. 14) to produce the averaging curve can be, for example, in the range 100-400. The Savitsky-Golay polynomial may be of fourth order.

The zeroed displacement data are then filtered by an adaptive process according to whether a synchronous or an asynchronous event is under consideration.

Firstly, an FFT is performed on the displacement data of each probe to transform the data into the frequency domain, the set of transformed data for each probe preferably including signals from all the blades of the rotor. FIG. 15 shows schematically displacement data 30 at a vibration event, and the corresponding frequency domain data 31.

The number of discreet bins in the frequency domain data is in proportion to the number samples used to fill the input FFT buffer. The number of samples also determines the latency between acquiring data and processing data. For real-time processing, the data arrives at the input FFT buffer at a rate equal to the OPR frequency multiplied by the number of blades.

The frequency domain data 31 has two strong peaks. When such data is repeatedly obtained at subsequent time steps, the strong peaks produce tracked orders. FIG. 16 is a schematic plot of frequency against time, and shows a tracked order as a thick continuous sloping line.

FIG. 16 also shows integral sampling positions as horizontal dashed lines. The integral sampling positions are frequencies corresponding to the rotational frequency of the rotor and multiples thereof up to the multiple corresponding to the number of blades in the assembly. The spacing of the integral sampling positions is determined by dividing the number of points in the FFT by the number of blades on the rotor.

In the time domain, the theoretical displacement data for a vibration event registered at a single probe and for a single blade might take the form shown in FIG. 17a, although noise will produce actual displacement data more like that shown in FIG. 17b. As the response approaches an integral sampling position, its aliased frequency drops to DC and then increases again as it moves away from the integral sampling position. In general, the point of maximum interest is at the DC point, but this is where the noise has its most detrimental effect.

Filtering needs to be applied to reduce the noise in the data, but the undersampled nature of the data means that different components of the data should have different filtering coefficients.

Thus the second step of the adaptive filtering process is to filter the displacement data of the selected probe at each of the identified vibration events in the time domain, the characteristic of the filter varying according to a control law which depends on the tracked order positions of the event relative to the integral sampling positions. The filter may be, for example, a Butterworth or Bessel filter, the weighting coefficients of the filter being varied with time depending on the relative position of the respective tracked orders. The weightings effectively control the filter cut off frequency and response. The weighting values can be determined experimentally or follow a mathematical law.

Returning to the time domain, FIG. 18a shows the effect of a control law applying a linear change in cut off frequency with bin position applied to the data of FIG. 17b, and FIG. 18b shows the effect of a control law applying an exponential change in cut off frequency with bin position. In both cases, the noise has been reduced, improving significantly the measurement uncertainty. Further, the filter adapts to the spectral content of the displacement data, which is determined by the signal frequency being analysed.

FIG. 19a shows a plot of frequency against time for real data. A tracked order corresponding to a vibration event appears as a thick line, consecutive sections of the tracked order being labelled A, B and C. In section A, which is the majority of the event, the tracked order is positioned between two integral sampling positions, and a filter of type A is applied to the data. Towards the end of the tracked order at section B, the event switches to an integral sampling position, and different filter of type B is applied to the data. Finally, at section C a further filter of type C is applied when the tracked order switches to a different bin position (although the different bin position is difficult to identify visually). The switching between filter types can be accomplished by having the filter coefficients change dynamically or by having several filters running continuously and simply selecting the required output according to tracked order bin position relative to integral sampling position. FIGS. 19b to d are plots of displacement against time (their time scales being aligned with that of FIG. 19a) and show respectively the effects of the different filters A to C on the displacement data collected by a single probe from a single blade of the rotor for the time period of the tracked order.

Having filtered the data, it can then be used to extract individual blade amplitudes and frequency. Techniques for such extraction are known to the skilled person. The use of the tracking filter has been shown to reduce uncertainty by up to 10%.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A method of identifying synchronous and asynchronous frequency vibration events of an individual blade in an assembly of rotating blades mounted on a rotor, a stationary timing probe associated with the individual blade detecting times at which the individual blade passes the stationary timing probe, the method comprising:
   obtaining blade timings detected by the stationary timing probe, the blade timings corresponding to an actual position of the individual blade at a given time, the stationary timing probe being disposed relative to the individual blade such that the stationary timing probe detects blade timings;
   determining, for successive rotations of the individual blade, respective correlation factors for the individual blade, each correlation factor quantifying a degree of correlation between the blade timings detected by the stationary timing probe for the individual blade on a particular rotation and the blade timings detected by the stationary timing probe for the individual blade on a previous rotation;
   identifying at least one resonant vibration event from a group consisting of: a synchronous vibration event and an asynchronous vibration event, when at least one of the respective correlation factors crosses a predetermined threshold;
   determining a stress included in the individual blade; and
   outputting the determined stress indicating at least one resonant vibration event in order to modify or maintain: (i) a design, (ii) an operation and/or (iii) a maintenance of the individual blade, the rotor, and/or the engine.

2. The method of claim 1, further comprising processing the blade timings by performing the substeps of:
   selecting the stationary timing probe;
   fitting an averaging curve to the blade timings of the selected stationary timing probe outside the at least one identified resonant vibration event;
   interpolating sections for the averaging curve at the blade timings of the selected stationary timing probe inside the at least one identified resonant vibration event;
   augmenting the averaging curve with the interpolated sections; and
   subtracting the augmented averaging curve from the blade timings of the selected stationary timing probe to produce zeroed blade timings for the selected stationary timing probe.

3. The method of claim 1, further comprising filtering the blade timings by performing the substeps of:
   selecting the stationary timing probe;
   transforming the blade timings of the selected stationary timing probe into a frequency domain, the transformed blade timings producing tracked orders at the at least one identified resonant vibration event in a plot of frequency against time;
   defining integral sampling positions as frequencies corresponding to a rotational frequency of the rotor and multiples thereof up to a multiple corresponding to the number of blades in the assembly of rotating blades;
   for the at least one identified resonant vibration event, determining tracked order positions relative to the defined integral sampling positions; and
   filtering the blade timings of the selected stationary timing probe at the at least one identified resonant vibration event in the time domain, the characteristic of the filter varying depending on the corresponding relative tracked order positions in the frequency domain.

4. The method of claim 1, wherein the step of obtaining blade timings further comprises:
   detecting the times at which the individual blade passes the stationary timing probe.

5. The method of claim 1, wherein the stationary timing probe measures deflections of a tip of the individual blade.

6. The method of claim 1, wherein a frequency of the at least one identified resonant vibration event is undersampled by the stationary timing probe.

7. A computer-based system for performing the method of claim 1.

8. A non-transitory computer readable medium storing computer instructions, which when executed, perform the method of claim 1.

9. The method of claim 1, further comprising:
   calculating the displacement of the blade from the obtained blade timing.

10. A method of processing individual blade timings detected by a stationary timing probe associated with an assembly of rotating blades mounted on a rotor, the stationary timing probe detecting times at which the individual blade passes the stationary timing probe, the method comprising:
   obtaining blade timings detected by the stationary timing probe to obtain timing data, the timing data corresponding to an actual position of the individual blade at a given time, the stationary timing probe being disposed relative to the individual blade such that the stationary timing probe detects blade timings;
   determining, for successive rotations of the individual blade, respective correlation factors for the individual blade, each correlation factor quantifying a degree of correlation between the blade timings detected by the stationary timing probe for the individual blade on a particular rotation and the blade timings detected by the stationary timing probe for the individual blade on a previous rotation;
   identifying in the timing data at least one resonant vibration event from a group consisting of: a synchronous vibration event and an asynchronous vibration event, when at least one of the correlation factors crosses a predetermined threshold;
   fitting an averaging curve to the blade timings outside the at least one identified resonant vibration event;
   interpolating sections for the averaging curve at the blade timings inside the at least one identified one resonant vibration event;
   augmenting the averaging curve with the interpolated sections;
   subtracting the augmented averaging curve from the blade timings to produce zeroed blade timings; and outputting the zeroed blade timings indicating at least one resonant vibration event in order to modify or maintain: (i) a design, (ii) an operation and/or (iii) a maintenance of the individual blade, the rotor, and/or the engine.

11. The method of claim 10, further comprising filtering the blade timings by performing the substeps of:
   transforming the blade timings into a frequency domain, the transformed blade timings producing tracked orders at the at least one identified one or more resonant vibration event in a plot of frequency against time;
   defining integral sampling positions as frequencies corresponding to a rotational frequency of the rotor and multiples thereof up to a multiple corresponding to a number of blades in the assembly;
   for the identified one resonant vibration event, determining the tracked order positions relative to the integral sampling positions; and
   filtering the blade timings at the identified resonant vibration event in the time domain, the characteristic of the filter varying depending on the corresponding relative tracked order positions in the frequency domain.

12. The method of claim 10, wherein the step of obtaining blade timings further comprises:
   detecting the times at which the blades pass the stationary timing probe.

13. The method of claim 10, further comprising:
   calculating the displacement of the blade from the obtained blade timing.

14. A method of filtering an individual blade timing detected by a stationary timing probe associated with an assembly of rotating blades mounted on a rotor, the stationary timing probe detecting the times at which the individual blade passes the stationary timing probe, the method comprising:
   obtaining individual blade timings detected by the stationary timing probe, the individual blade timings corresponding to an actual position of the individual blade at a given time, the stationary timing probe being disposed relative to the individual blade such that the stationary timing probe detects blade timings;
   identifying in the timing data at least one resonant vibration event from a group consisting of: a synchronous vibration event and an asynchronous vibration event;
   transforming the individual blade timings into a frequency domain, the transformed blade timings producing tracked order positions at the at least one identified resonant vibration event in a plot of frequency against time;
   defining integral sampling positions as frequencies corresponding to a rotational frequency of the rotor and multiples thereof up to a multiple corresponding to a number of blades in the assembly;
   for the at least one identified resonant vibration event, determining the tracked order positions relative to the defined integral sampling position;
   adaptively filtering the individual blade timings for the at least one identified resonant vibration event in a time domain, the filtering varying depending on the tracked order positions in the frequency domain;
   using the filtered individual blade timings to extract individual blade amplitudes and frequencies; and
   outputting the individual blade amplitudes and frequencies indicating at least one resonant vibration event in order to modify or maintain: (i) a design, (ii) an operation and/or (iii) a maintenance of the individual blade, the rotor, and/or the engine.

15. The method of claim 14, further comprising:
increasing filtering where a synchronous event occurs.

16. The method of claim 14, further comprising:
calculating the displacement of the blade from the obtained blade timing.

* * * * *